(12) United States Patent
Taylor et al.

(10) Patent No.: US 9,095,808 B2
(45) Date of Patent: Aug. 4, 2015

(54) ELECTROLYTIC SYSTEM AND METHOD FOR FILTERING AN AQUEOUS PARTICULATE SUSPENSION

(75) Inventors: E. Jennings Taylor, Troy, OH (US); Maria I. Inman, Yellow Springs, OH (US); Joseph Kell, Dayton, OH (US); Heather McCrabb, Kettering, OH (US); Anthony Ferrante, Belmont, MA (US); Ross Youngs, Dublin, OH (US); John Nicholas Meister, Columbus, OH (US); James Robert Cook, Dublin, OH (US)

(73) Assignees: Physical Sciences, Inc., Andover, MA (US); Faraday Technology, Inc., Clayton, OH (US)

( * ) Notice: Subject to any disclaimer, the term of this patent is extended or adjusted under 35 U.S.C. 154(b) by 978 days.

(21) Appl. No.: 13/249,322

(22) Filed: Sep. 30, 2011

(65) Prior Publication Data
US 2012/0091000 A1    Apr. 19, 2012

Related U.S. Application Data

(60) Provisional application No. 61/392,738, filed on Oct. 13, 2010.

(51) Int. Cl.
*B01D 57/02* (2006.01)
(52) U.S. Cl.
CPC ...................................... *B01D 57/02* (2013.01)
(58) Field of Classification Search
CPC ................................ B01D 57/02; B01D 65/02
USPC .......................................... 205/518; 204/518
See application file for complete search history.

(56) References Cited

U.S. PATENT DOCUMENTS

| | | | | |
|---|---|---|---|---|
| 5,342,514 | A | * | 8/1994 | Turner et al. ................... 204/627 |
| 5,900,127 | A | | 5/1999 | Iida et al. |
| 5,916,431 | A | * | 6/1999 | Turner et al. ................... 205/704 |
| 2010/0224574 | A1 | | 9/2010 | Youngs et al. |

OTHER PUBLICATIONS

Shelef, G. et al., "Microalgae Harvesting and Processing: A Literature Review," U.S. DOE Solar Energy Research Institute, A Substract Report, Contract No. DE-ACO2-83CH10093 (Aug. 1984).
Contreras, S. et al., "A Highly Efficient Electolytic Method for Microorganism Flocculation from Aqueous Cultures," Biotechnology and Bioengineering, vol. XXIII, pp. 1165-1168 (1981).

* cited by examiner

*Primary Examiner* — Arun S Phasge
(74) *Attorney, Agent, or Firm* — Thompson Hine LLP

(57) ABSTRACT

An electrolytic filtration method and apparatus for the concentration and collection of suspended particulates from aqueous solutions is disclosed. The electrolytic cell contains at least an anode and a cathode, and in one embodiment contains a plurality of anodes and cathodes. The electrolytic cell also contains a filter, and in one embodiment the filter is a moving belt filter. While not bound by theory, the electrolytic filtration method and apparatus is based on the electrophoretic movement of algae particles suspended in an aqueous solution away from the filter under the influence of an electric field. In one embodiment the electric field is a pulsed waveform with unidirectional voltage or current pulses. In another embodiment, the electric field is a pulsed waveform with bidirectional voltage or current pulses.

22 Claims, 14 Drawing Sheets

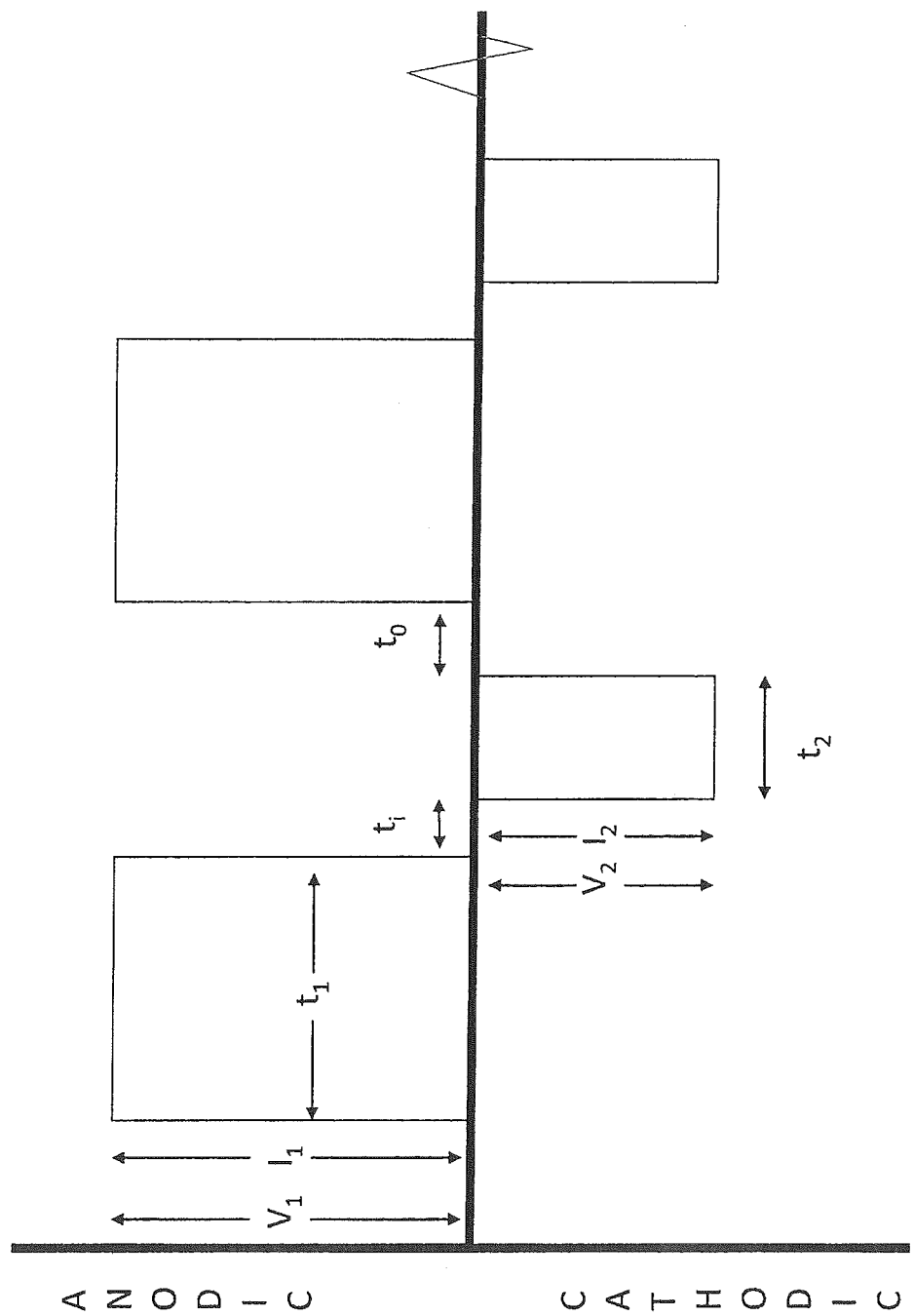

ELECTROLYTIC SYSTEM AND METHOD FOR FILTERING AN AQUEOUS PARTICULATE SUSPENSION

CROSS REFERENCE TO RELATED APPLICATIONS

This application claims the benefit of U.S. Provisional Application 61/392,738 filed Oct. 13, 2010.

STATEMENT REGARDING FEDERALLY SPONSORED RESEARCH OR DEVELOPMENT

This invention was made with U.S. Government support under National Science Foundation SBIR Grant No. IIP-0944523. The U.S. Government may have certain rights in the invention.

FIELD OF THE INVENTION

This invention relates to the filtration of aqueous solutions containing suspended particles and, more particularly, to the filtration of aqueous growth mediums containing suspended algae. This invention further relates to the filtration of such solutions under the influence of an electric field, whereby clogging of the filter medium is minimized or eliminated.

BACKGROUND

Many industrially important processes require water removal apparatus and processes which consume low amounts of energy. More specifically, dewatering algae is a major hurdle in the economic production of algae derived biofuels, pharmaceuticals, and nutraceuticals.

Oil-producing microalgae are an attractive alternative to conventional fuel sources as they grow extremely rapidly, have the potential to produce as much as 100 times more oil per hectare of land area than land-based crops, and, if properly exploited, can serve as a biofuel source that is economical, sustainable, reduces global warming, reduces the need to displace conventional food crops, and provides energy independence.

Oleaginous microalgae use photosynthesis to capture carbon from the air (in the form of carbon dioxide) to produce the various cellular chemicals needed to live. One class of cellular chemicals of particular interest is lipids. When properly grown, some of the oleaginous microalgae species can reach up to eighty percent lipid content (by cell dry weight), which includes hydrocarbons (e.g., β-carotene, terpenoids), triglycerides, and other minor components (e.g., sterols, glycolipids, and phospholipids). While some of these hydrocarbons can often be used directly a diesel-grade motor fuel, many of these lipids, through post-processing, can also be transformed into other types of organic compounds and feedstocks.

There are two main approaches to growing algae in bulk: closed bioreactors and open ponds. Bioreactors are often 10-100 times more costly to build and operate as compared to open ponds, which limits their usefulness outside of products that require tight controls and are highly value-added (e.g., pharmaceuticals and nutraceuticals). However, although cheaper, open ponds have some potential problems with contamination and overall biomass concentration. One approach that combines some of the advantages of the bioreactor and open pond layouts consists of using large ponds covered with a canopy. This hybrid system protects the algae from many of the harmful effects of the environment while still allowing for large, pond-like growth areas. However, a major challenge for production of algae derived biofuels still remains: the harvesting of the lipids from the algae in a large scale, cost-effective manner.

In order to use algae-derived hydrocarbons as a fuel or as a feedstock for fuel production, pharmaceutical production, and/or nutraceutical production, the algae must be separated from an aqueous growth medium (an aqueous solution containing trace elements such as nitrogen, phosphorous, etc.) using apparatuses and processes which require substantially less energy input than the energy content of the algae biomass or, alternately, less energy investment than the value of the product. For biofuel production, the target energy requirement, as stated by the U.S. Department of Energy, is that the energy must be less than or equal to 10% of the energy content of the biomass.

Several suspended particle separation technologies are known in the art and include centrifugation, flotation, filtration, sedimentation, and the like. However, these either consume too much energy, operate at low throughput, or require the addition of chemicals that require subsequent removal. Current methods to extract the oil from algae are solvent extraction (for example, supercritical $CO_2$, hexane, benzene) and an expeller press. Solvent extraction produces hazardous waste as a byproduct, and both solvent extraction and expeller press processes tend to be energy intensive, reducing the net energy yield of the oil. Solvent inputs and press machinery are also quite costly.

Filtration is a low energy consumption separation technology, and filtration is often combined with other separation technologies in a hybrid concept. A significant limitation of filtration is that as the separation process proceeds, the filter medium becomes clogged with the suspended particles. At this point the separation of suspended particles from the solution becomes slow, and the filter medium must be replaced, backwashed, or otherwise rejuvenated to re-establish acceptable solution flow rates and/or differences in head. As the filter medium becomes clogged with suspended particles, the operating and capital cost of filtration-based separation technology becomes higher. Consequently, there is a need for filtration technology in which clogging of the filter medium with suspended particles is minimized or eliminated.

SUMMARY OF THE INVENTION

The subject invention is an electrolytic apparatus and method for the separation of suspended particles, such as algae, from an aqueous solution, such as nitrogen and phosphorous enriched water. The electrolytic apparatus may direct an aqueous particulate suspension between an electrode pair, and apply a current or voltage across the electrode pair to effect movement of the particulates to a location where the concentrated particulate suspension may be collected. In one embodiment of the invention, the current or voltage applied to the electrode pair is a pulsed current or pulsed voltage. In another embodiment, the aqueous particulate suspension is directed through a plurality of electrode pairs.

The subject invention is an electrolytic filtration apparatus and method for the separation of suspended particles, such as algae, from an aqueous solution, such as nitrogen and phosphorous enriched water. The invention is based on the filtration of an aqueous particulate suspension under the influence of an electric field. The electric field comprises a current or voltage controlled field to effect movement of the particulates away from the filter medium, whereby clogging of the filter medium is minimized or eliminated. In one embodiment of the invention, the current or voltage applied to an electrode pair is a pulsed current or pulsed voltage. In another embodiment, the electric field is generated through a plurality of electrode pairs.

BRIEF DESCRIPTION OF THE DRAWINGS

FIG. 10b is a schematic representation of a bidirectional electrolytic pulse reverse process.

Figure 1:
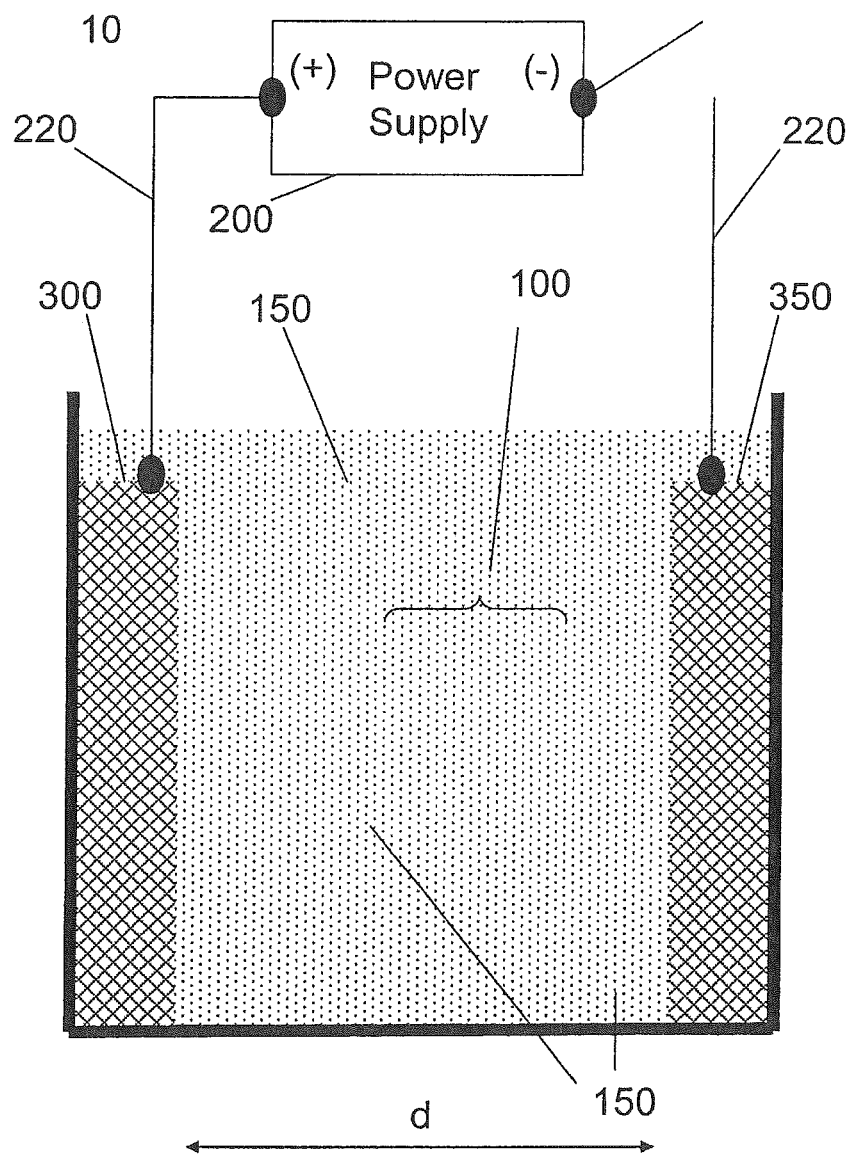
FIG. 1 is a schematic representation of an aqueous particulate suspension in the electrolytic apparatus prior to application of the electrolytic field.

The descriptions and identification of the items in the figures are tabulated in the following table.

| Numeral | Item Description |
| --- | --- |
| 10 | Electrolytic Apparatus |
| 20 | Multi-electrode Electrolytic Apparatus |
| 100 | Algal Suspension/Aqueous Particulate Suspension |
| 120 | Depleted Algal Suspension/Aqueous Particulate Suspension |
| 150 | Particle |
| 180 | Concentrated Algal Suspension/Aqueous Particulate Suspension |
| 200 | Power Supply |
| 220 | Electrical Lead |
| 300 | Anode |
| 350 | Cathode |
| 400 | Filter |
| 400a | Moving Filter Belt |
| 420 | Depleted Suspension Collection Vessel |
| 480 | Concentrated Suspension Collection Vessel |

DETAILED DESCRIPTION OF THE INVENTION

There are many species of algae with different characteristics that affect their applicability to biofuel production. For example, different algae species have different sizes, different densities, different hydrocarbon or energy content, different growth requirements (light, food, media, etc.), and different predominant extracellular and intracellular hydrocarbons. In many respects, algae have the characteristics of particles. In one respect, particles in an aqueous suspension develop a solid-liquid interface. This solid-liquid interface leads to an electrochemical double layer. The first layer is called the Stern layer or fixed layer and consists of a fixed charge attached to the particle surface. The second layer is called the Gouy layer or diffuse layer and consists of an excess of ions of opposite charge to those of the fixed layer and a depletion of co-ions of the same charge as those of the fixed layer. Neither of these charged layers can be measured directly. The interactions of the algae cells with the water and the resulting electric repulsion between the like charged algae cells contribute to the stability of an algae suspension. Similar interactions of the cell surfaces of other microorganisms, including yeasts, bacteria, archaebacteria, and the like, as well as some hydrocolloids, can contribute to the stability of respective suspensions, and thus, although this application refers to the processing of algal suspensions as a preferred use, one skilled in the art will recognize that the algal suspensions discussed herein are specific examples of a more general aqueous particulate suspension, and that the discussion hereafter may be readily generalized for application to such aqueous particulate suspensions.

The intensity of the charge on the algae cell is dependent on a number of factors, including, 1) algae species, 2) dissolved solution ions and solution constituents, and 3) solution pH. Therefore, various algae species and the environments in which they reside are characterized by a zeta potential, $\zeta$. The zeta potential is the potential difference between the bulk solution and the stationary layer of solution attached to the subject particle. The zeta potential cannot be measured directly but rather is calculated using theoretical models and experimentally determined mobility under the influence of an electric field. Algae surfaces are generally thought to carry a negative charge. See G. Shelef et al., "Microalgae harvesting and Processing: A Literature Review," U.S. DOE Solar Energy Research InstituteA Substract Report (Contract No. DE-AC02-83CH10093), August 1984. Whether the algae surfaces are negatively or positively charged, the subject invention, while not bound by any theory, creates a concentrated zone of suspended algae and a depleted zone of suspended algae by electrophoretic movement under the influence of an electric field or pulsed electric field. In addition, or alternately, the subject invention may disrupt the algal suspension by weakening the repulsive affect of adjacent Gouy layers, allowing for contact between respective particle surfaces and, at least in the case of suspended organic materials such as algae, agglomeration of the particulates into larger conglomerates. Consequently, the conglomerates may float or settle within the solution due to bulk density differences between the conglomerate and the solution caused by the applied electric field(s).

Conventional electrophoretic processing is accomplished using constant voltage or current conditions for the duration of the process. During electrophoretic processing under constant voltage control, the drift velocity of spherical particles in suspension can be expressed as $$V = \frac{2}{3}\varepsilon_o \varepsilon_r \zeta \eta^{-1}\left(\frac{df}{dx}\right) \quad (1)$$

where $\epsilon_0$ is the permittivity of vacuum, $\epsilon_r$ is the relative permittivity of the solvent, $\zeta$ is the zeta potential of the particle, $\eta$ is the viscosity of the solvent, and df/dx represents the strength of the applied electric field. The drift velocity is likely to affect the processing rate as higher drift velocities will yield greater algae movement, and therefore faster concentration.

The equation suggests that the drift velocity of the spherical particles (in this case, algae) in the suspension is a function of the applied electric field during the electrophoretic process. This implies that the homogeneity of the electric field (i.e., the "current distribution") is important for a uniform, energy efficient electrolytic concentration process through controlling the distribution of the concentrated algae mass.

FIG. 1 is a schematic representation of an algal suspension (100) in the electrolytic apparatus (10) prior to application of the electrolytic process. The algal suspension (100) contains suspended algae particles (150) and is collected from an algae pond, a bioreactor, or a hybrid covered pond. The electrolytic apparatus (10) contains an anode (300) and a cathode (350) in electrical contact to a power supply (200) with electrical leads (220). The gap "d" between the anode (300) and cathode (350) is determined by one skilled in the art as trade-off of operating cost considerations and capital cost considerations. The gap can be generally as large as 5 m or generally as small as 0.5 cm. The anode (300) and cathode (350) should exhibit good stability in the electrolytic concentration environment. In one example, both the anode and the cathode consist essentially of a titanium substrate with a mixed oxide coating.

Figure 2A:
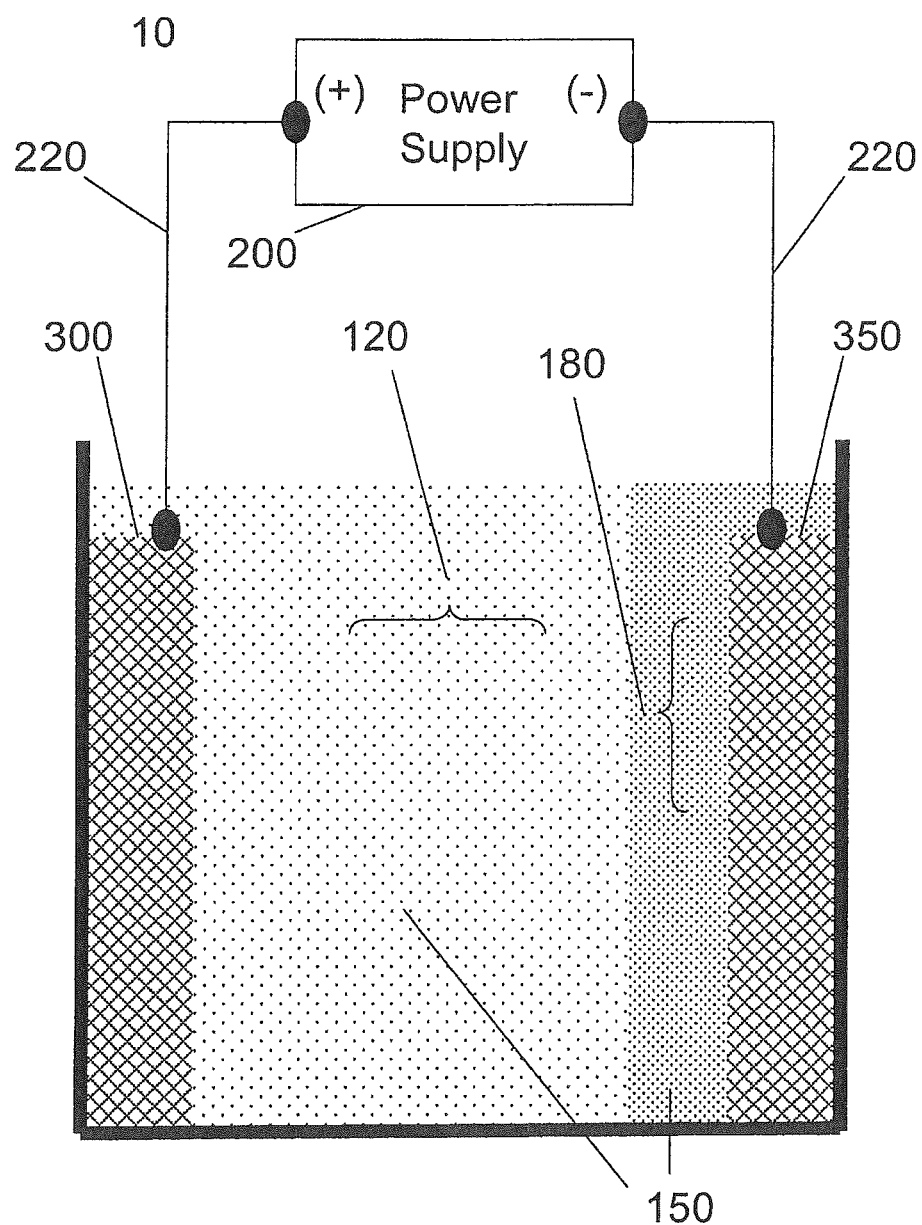
FIG. 2a is a schematic representation of a particulate movement scheme in the electrolytic apparatus after application of the electrolytic field.
Figure 2B:
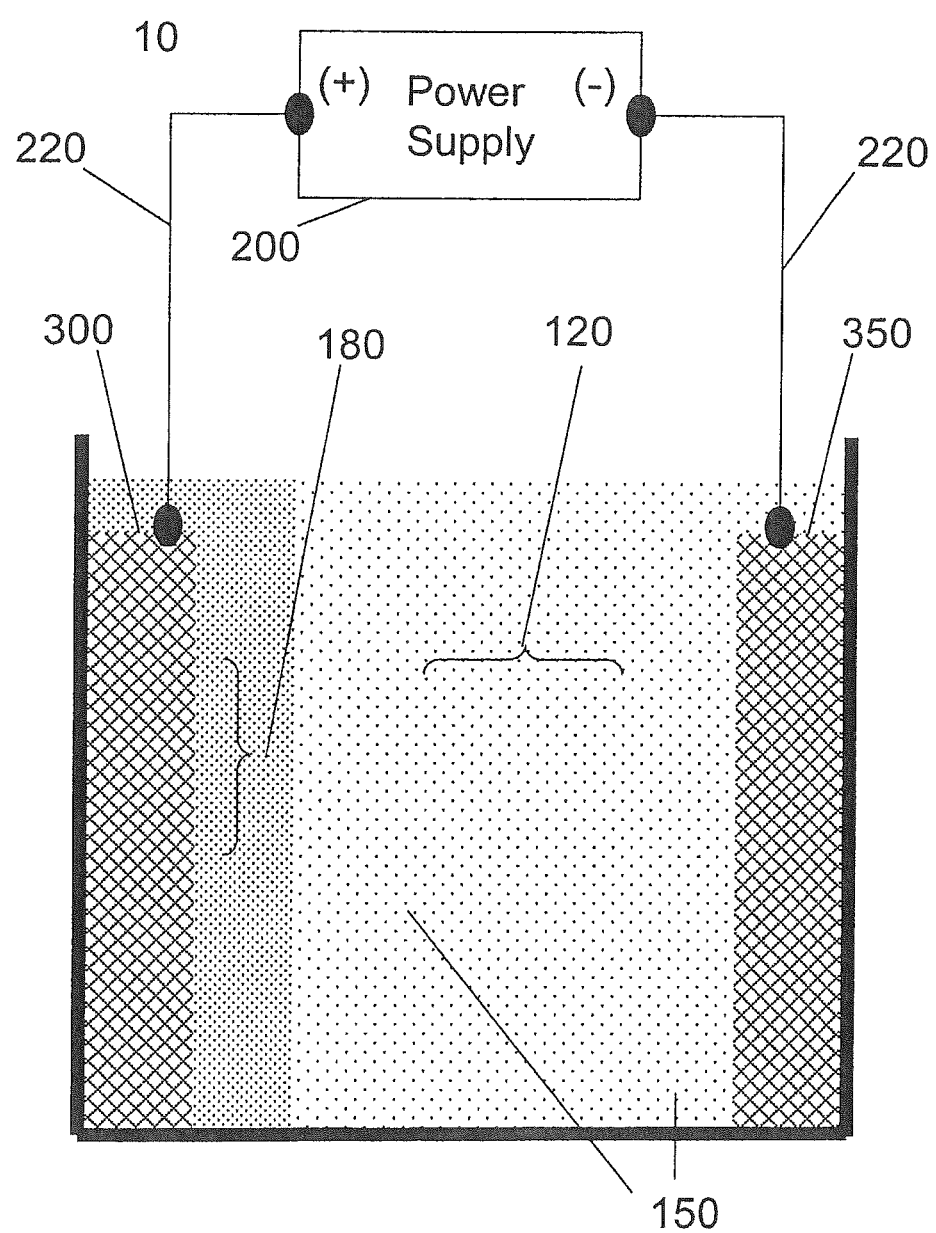
FIG. 2b is a schematic representation of another particulate movement scheme in the electrolytic apparatus after application of the electrolytic field.
Figure 2C:
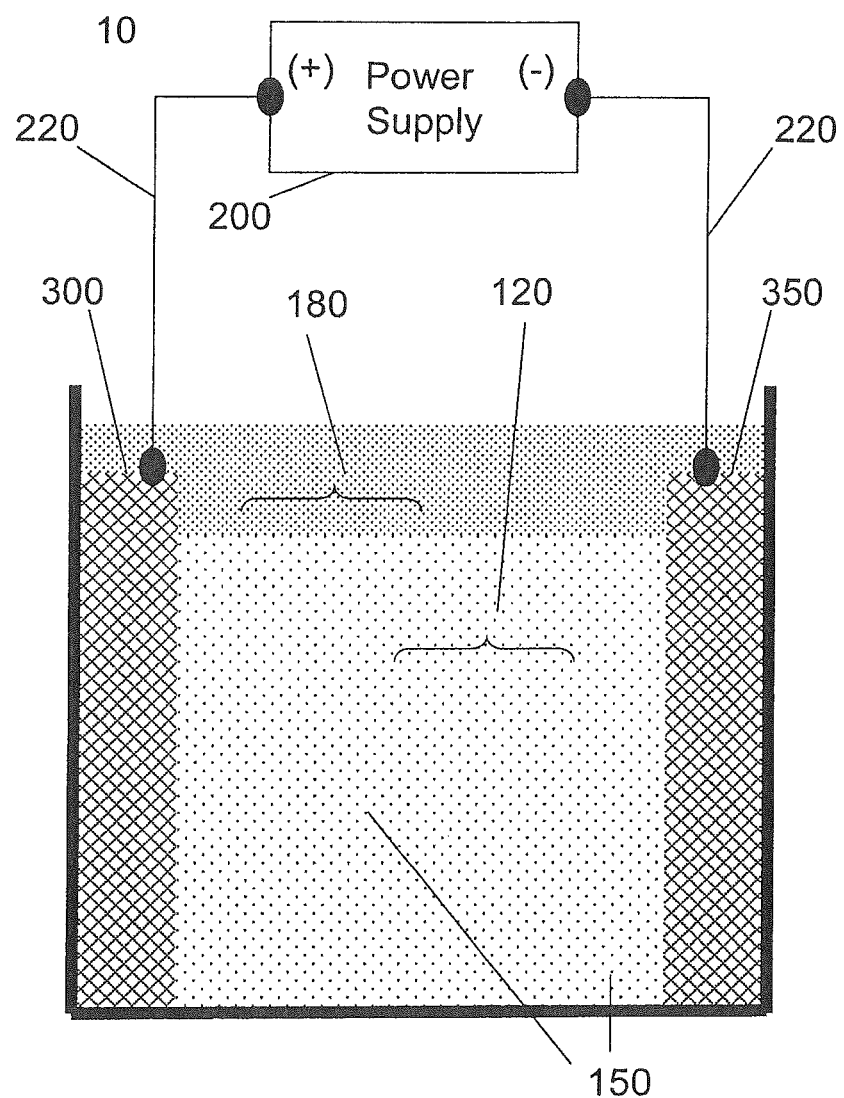
FIG. 2c is a schematic representation of still another particulate movement scheme in the electrolytic apparatus after application of the electrolytic field.

FIG. 2 represents three different electrolytic algae concentration paths. Depending on the algae species, the nature of the aqueous solution (such as salinity and/or specific gravity), and the electrolytic process parameters applied, the algae could move toward one electrode or the other, float on the top of the solution, or settle to the bottom of the solution. Movement in general and flotation versus settling will be influenced by the density/lipid content of the specific algae species. FIG. 2a is a schematic representation of an electrolytic concentration scheme in the electrolytic apparatus (10) after application of the electrolytic field wherein concentrated algal suspension (180) is formed proximate the cathode (350) leaving depleted algal suspension (120) generally between the anode (300) and cathode (350). FIG. 2b is a schematic representation of another electrolytic concentration scheme in the electrolytic apparatus (10) after application of the electrolytic field wherein concentrated algal suspension (180) is formed proximate the anode (300) leaving depleted algal suspension (120) generally between the anode (300) and cathode (350). FIG. 2c is a schematic representation of still another electrolytic concentration scheme in the electrolytic apparatus (10) after application of the electrolytic field wherein concentrated algal suspension (180) floats toward the surface of the electrolytic apparatus (10) leaving depleted algal suspension (120) generally between the anode (300) and cathode (350).

Figure 3:
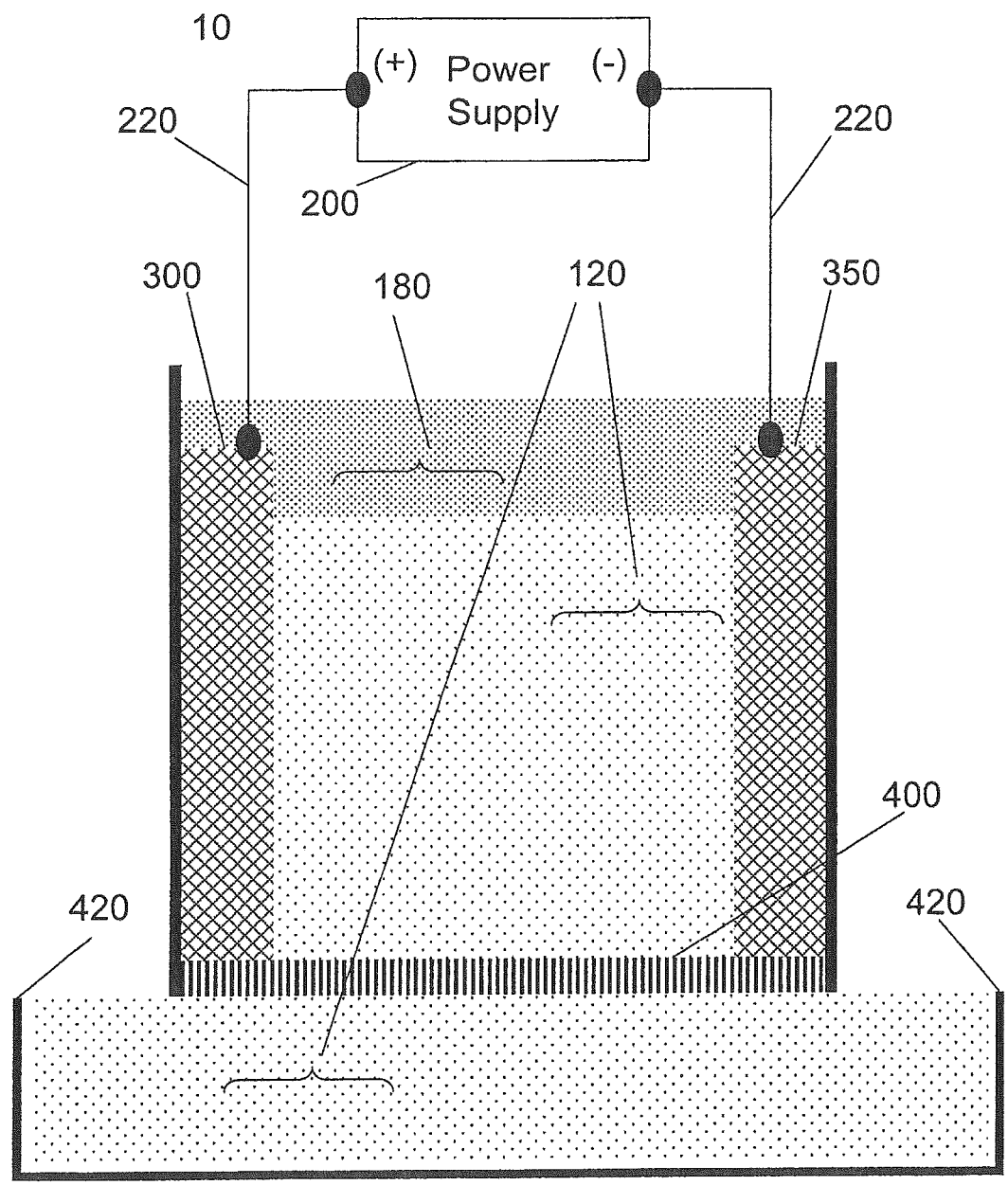
FIG. 3 is a schematic representation of particulate movement in an electrolytic apparatus with a filter and collection vessel for the depleted particulate suspension and resultant solution.

FIG. 3 is a schematic representation of an electrolytic apparatus (10) containing a filter (400) positioned below a vertically oriented anode (300) and a vertically oriented cathode (350), and above a depleted suspension collection vessel (420). After application of the electrolytic field, concentrated algal suspension (180) floats toward the surface of the electrolytic apparatus (10) and away from the filter (400) leaving depleted algal solution (120) adjacent to said filter (400). The depleted algal solution (120) freely flows due to the force of gravity through the filter (400) and into the depleted suspension collection vessel (420). One skilled in the art will recognize that the flow through the filter (400) could be assisted by pressurization of a substantially enclosed electrolytic apparatus (10), vacuum suction applied to a substantially enclosed depleted suspension vessel (420), or the like. In this manner, clogging of the filter (400) with algae particles (150) is minimized or potentially eliminated, especially compared to flowing concentrated algal solution (180) through the filter (400).

Figure 4A:
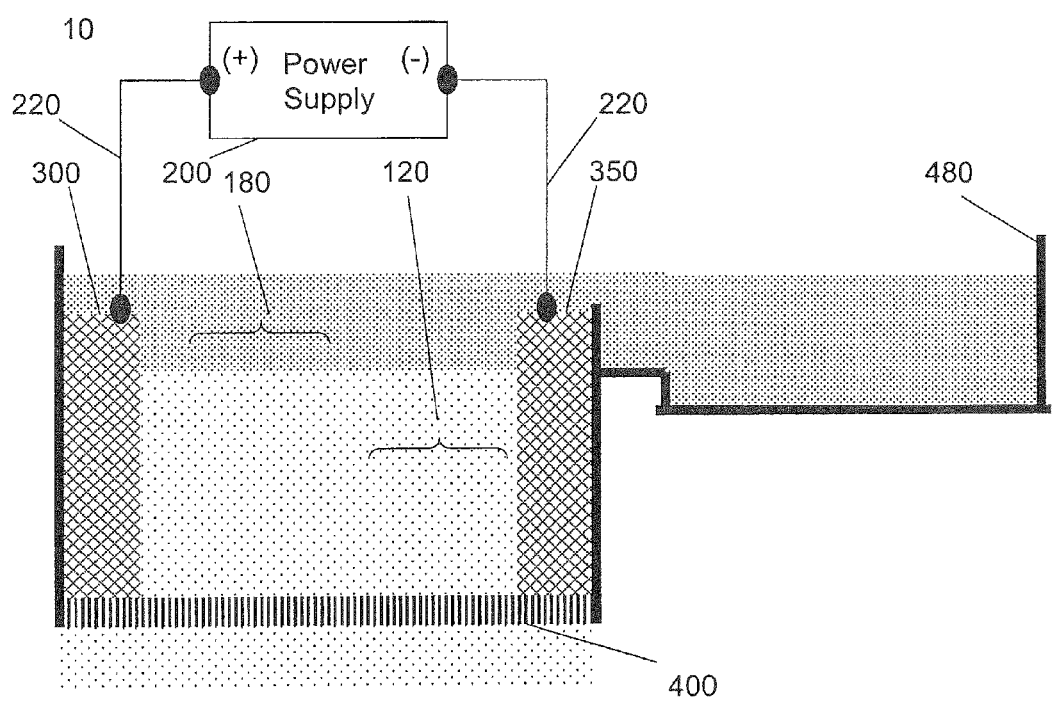
FIG. 4a is a schematic representation of particulate movement in an electrolytic apparatus with a filter and collection vessel for the concentrated particulate suspension.

FIG. 4a is a schematic representation of an electrolytic apparatus (10) containing a filter (400) positioned below a vertically oriented anode (300) and a vertically oriented cathode (350), and an associated concentrated suspension collection vessel (480). After application of the electrolytic field, the concentrated algal suspension (180) floats toward the surface of the electrolytic apparatus (10) and away from the filter (400). The concentrated algal suspension (180) is collected from the surface of the electrolytic apparatus and transferred to the concentrated suspension collection vessel (480). The collection of the concentrated algal solution (120) may be accomplished by any number of means known to those skilled in the art, including, but not limited to, skimming, overflow, suction, or the like. The depleted algal solution (120) may freely flow due to the force of gravity through the filter (400) for reuse, reprocessing into a suitable aqueous growth medium, or further treatment and disposal.

Figure 4B:
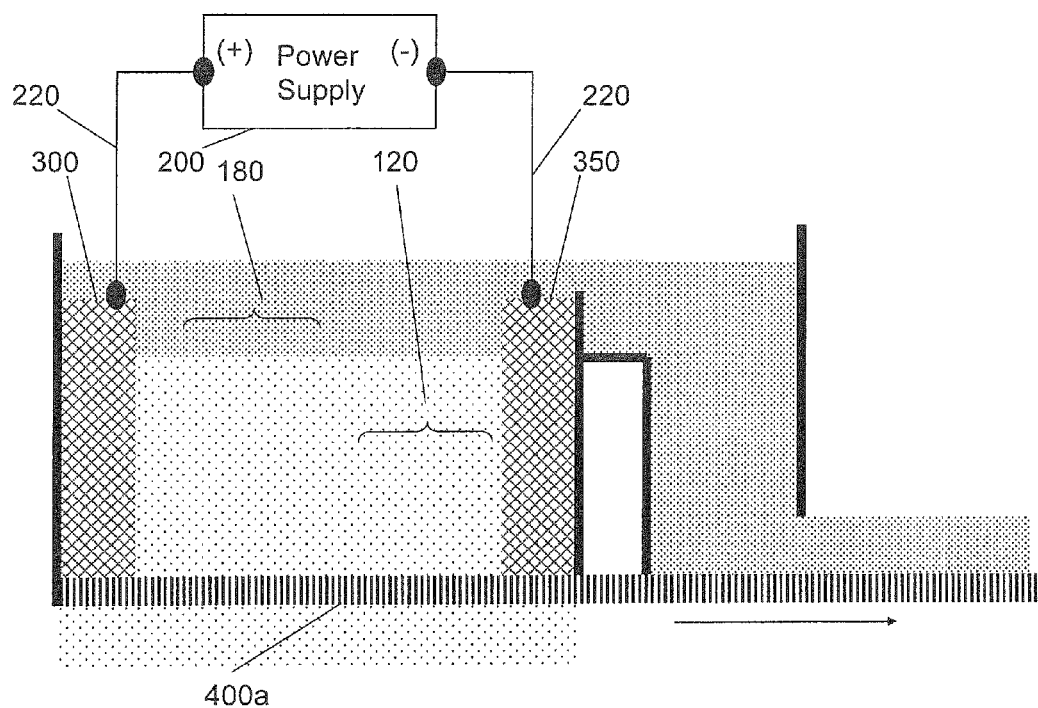
FIG. 4b is a schematic representation of particulate movement in an electrolytic apparatus with a moving filter for collection of the concentrated particulate suspension.

FIG. 4b is a schematic representation of an electrolytic apparatus (10) containing a moving filter belt (400a) positioned below a vertically oriented anode (300) and a vertically oriented cathode (350). After application of the electrolytic field, the concentrated algal suspension (180) floats toward the surface of the electrolytic apparatus (10) and away from the moving filter belt (400a). The concentrated algal suspension (180) may be collected from the surface of the electrolytic apparatus and transferred onto the moving filter belt (400a). After transfer of the concentrated algal suspension (180) onto the moving filter belt (400a), the material may be further concentrated by drying or applying heat, and the dried material may be subsequently removed from the belt. The removal may be accomplished by any number of means known to those skilled in the art, including, but not limited to, scraping or the like. The moving filter belt (400a), after removal of the dried material, is then available for reuse in filtering additional depleted algal solution (102) and handling concentrated algal solution (180). While the figure illustrates a particular collection scheme for use with the moving filter belt (400a) one skilled in the art will recognize that various collection schemes, including, but not limited to, skimming, overflow, suction, or the like, may transfer the concentrated algal suspension (180) to the moving filter belt (400a).

Figure 5:
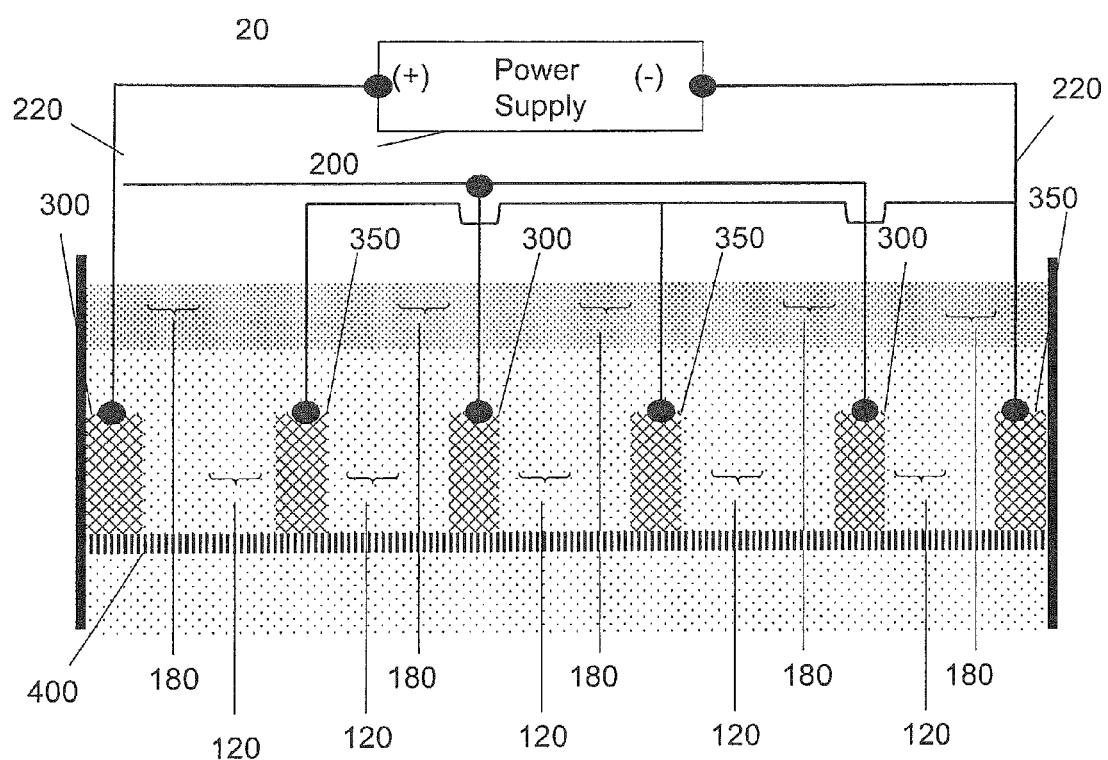
FIG. 5 is a schematic representation of algae movement in an electrolytic apparatus with a plurality of electrode pairs.

FIG. 5 is a schematic representation of a multi-electrode electrolytic apparatus (20) containing a filter (400) positioned below a plurality of vertically oriented cathodes (350) and vertically oriented anodes (300). After application of the electrolytic field, concentrated algal suspension (180) floats toward the surface of the multielectrode electrolytic apparatus (20) and away from the filter (400) leaving depleted algal suspension (120) adjacent to said filter (400). The depleted algal suspension (120) freely flows due to the force of gravity through the filter (400) and into the depleted suspension collection vessel (420). One skilled in the art will recognize that the flow through the filter (400) could be assisted by pressurization of the multi-electrode electrolytic apparatus (20) above the filter (400), vacuum suction applied to the multi-electrode electrolytic apparatus (20) below the filter (400), or the like. In this manner, clogging of the filter (400) with algae particles (150) is minimized or potentially eliminated, especially compared to flowing concentrated algal solution (180) through the filter (400).

Figure 6:
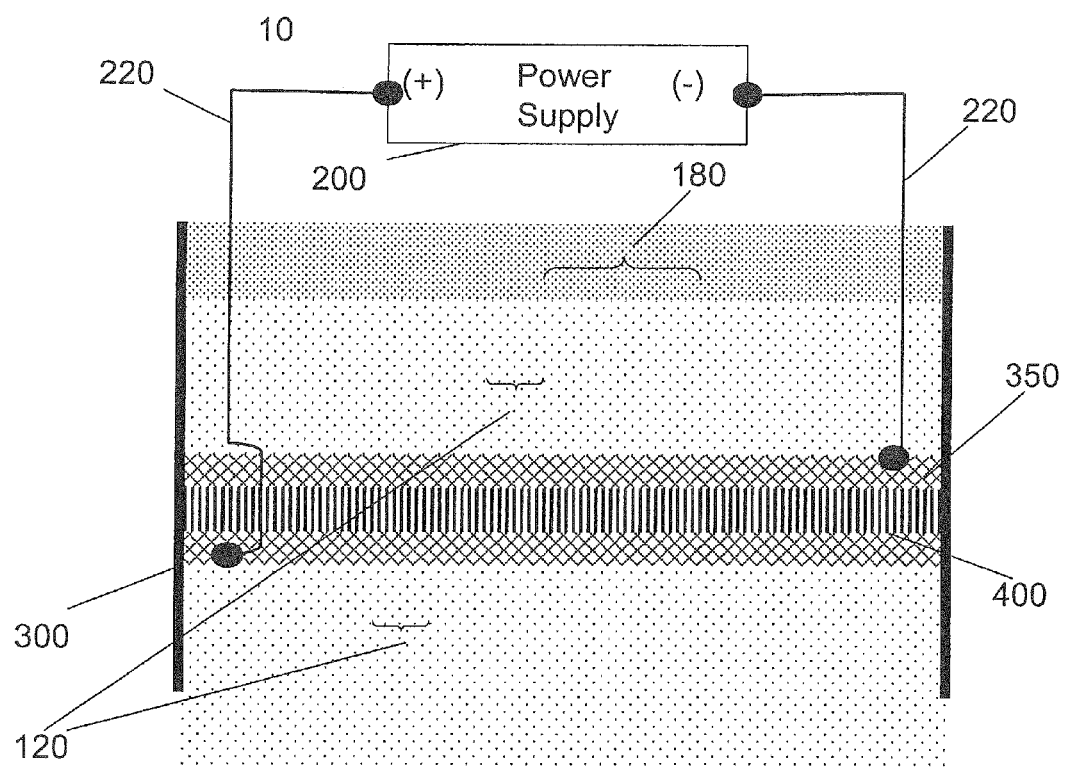
FIG. 6 is a schematic representation of particulate movement in an electrolytic apparatus with a filter, depicting electrodes in one position relative to the filter.

FIG. 6 is a schematic representation of an electrolytic apparatus (10) wherein the filter (400) is positioned between an anode (300) and a cathode (350). While the illustration depicts the anode (300) positioned below the filter (400) and the cathode (350) positioned above the filter (400), one skilled in the art will recognize that the anode (300) could be positioned above the filter (400) and the cathode (350) could be positioned below the filter (400), as appropriate. After application of the electrolytic field, concentrated algal suspension (180) floats toward the surface of the electrolytic apparatus (10) and away from the filter (400) leaving depleted algal suspension (120) adjacent to said filter (400). The depleted algal suspension (120) freely flows due to the force of gravity through the filter (400) and into the depleted suspension collection vessel (420). One skilled in the art will recognize that the flow through the filter (400) could be assisted by pressurization of the electrolytic apparatus (10) above the filter (400), vacuum suction applied to the electrolytic apparatus (10) below the filter (400), or the like. In this manner, clogging of the filter (400) with algae particles (150) is minimized or potentially eliminated, especially compared to flowing concentrated algal solution (180) through the filter (400).

Figure 7:
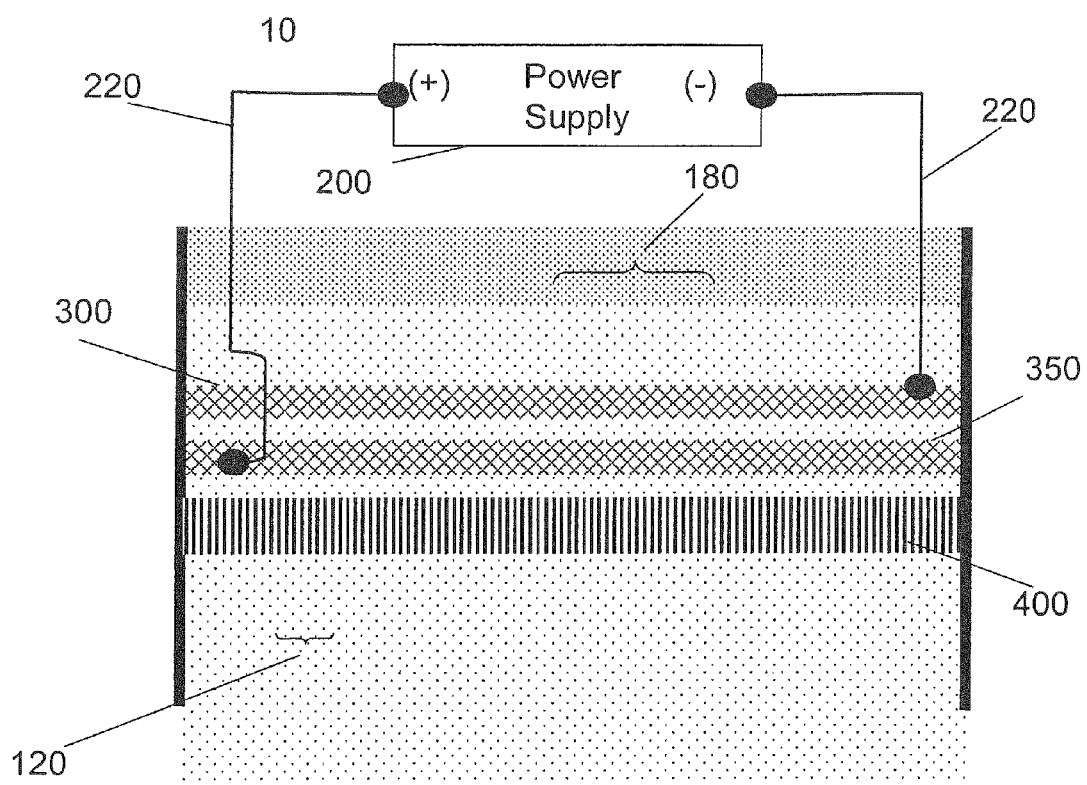
FIG. 7 is a schematic representation of particulate movement in an electrolytic apparatus with a filter, depicting electrodes in another position relative to the filter.

FIG. 7 is a schematic representation of an electrolytic apparatus (10) wherein the filter (400) is positioned below a horizontally oriented anode (300) and a horizontally oriented cathode (350). While the illustration depicts the anode (300) positioned below the cathode (350), one skilled in the art will recognize that the anode (300) could be positioned above the cathode (350), as appropriate. After application of the electrolytic field, concentrated algal suspension (180) floats toward the surface of the electrolytic apparatus (10) and away from the filter (400), leaving depleted algal suspension (120) adjacent to said filter (400). The depleted algal suspension (120) freely flows due to the force of gravity through the filter (400) and into the depleted suspension collection vessel (420). One skilled in the art will recognize that the flow through the filter (400) could be assisted by pressurization of the electrolytic apparatus (10) above the filter (400), vacuum suction applied to the electrolytic apparatus (10) below the filter (400), or the like. In this manner, clogging of the filter (400) with algae particles (150) is minimized or potentially eliminated, especially compared to flowing concentrated algal solution (180) through the filter (400).

Figure 8:
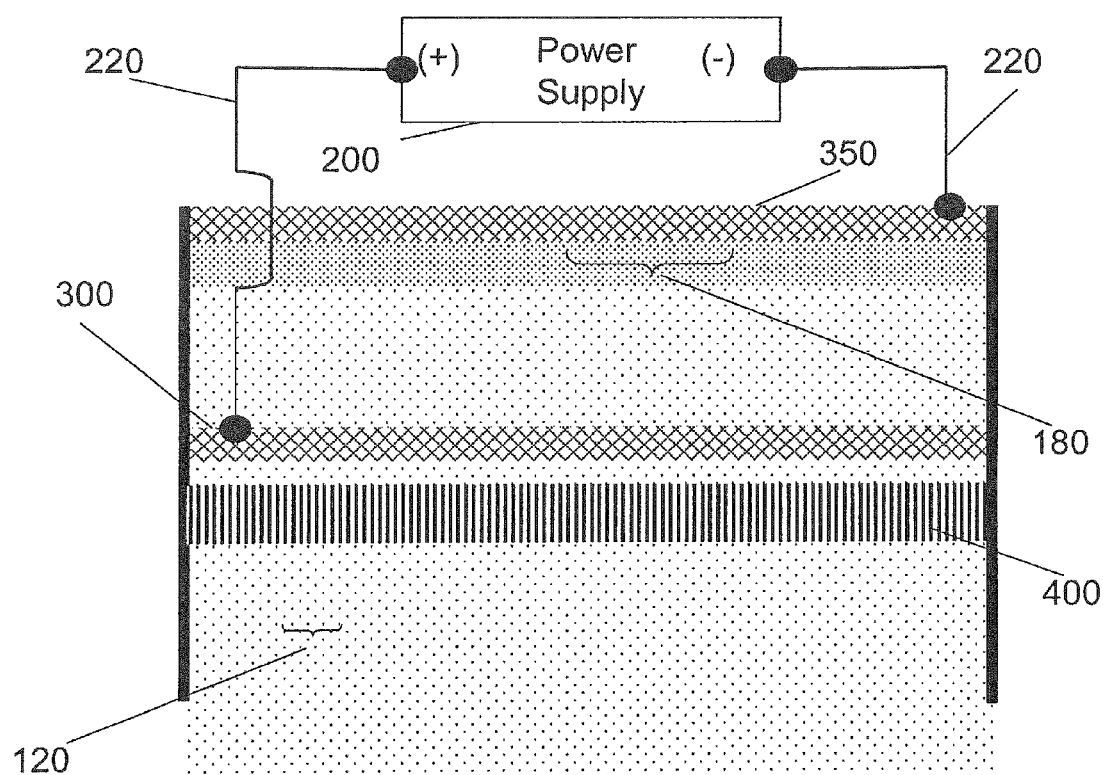
FIG. 8 is a schematic representation of particulate movement in an electrolytic apparatus with a filter, depicting electrodes in still another position relative to the filter.

FIG. 8 is a schematic representation of an electrolytic apparatus (10) wherein the filter (400) is positioned below a horizontally oriented anode (300) and a horizontally oriented cathode (350). While the illustration depicts the cathode (350) positioned near the surface of the electrolytic apparatus (10), one skilled in the art will recognize that the anode (300) could be positioned near the surface of the electrolytic apparatus (10), as appropriate. After application of the electrolytic field, concentrated algal suspension (180) floats toward the surface of the electrolytic apparatus (10) and away from the filter (400), leaving depleted algal suspension (120) adjacent to said filter (400). The depleted algal suspension (120) freely flows due to the force of gravity through the filter (400) and into the depleted suspension collection vessel (420). One skilled in the art will recognize that the flow through the filter (400) could be assisted by pressurization of the electrolytic apparatus (10) above the filter (400), vacuum suction applied to the electrolytic apparatus (10) below the filter (400), or the like. In this manner, clogging of the filter (400) with algae particles (150) is minimized or potentially eliminated, especially compared to flowing concentrated algal solution (180) through the filter (400).

Figure 9:
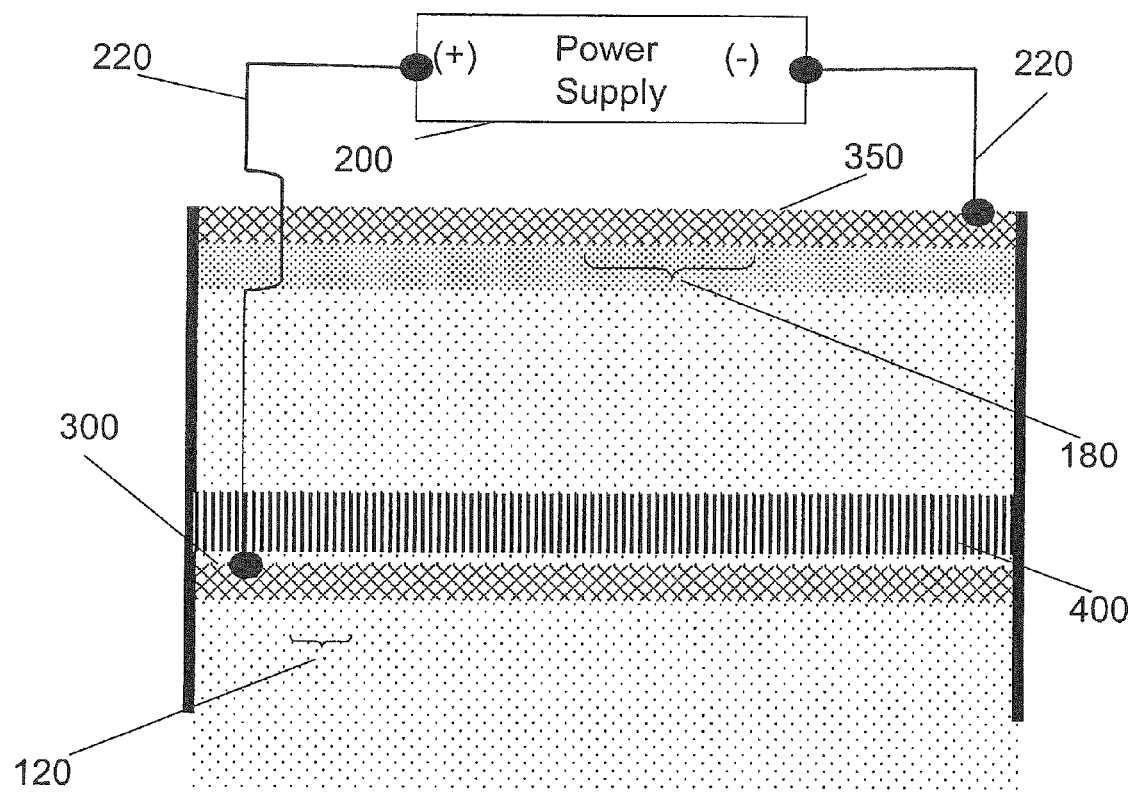
FIG. 9 is a schematic representation of particulate movement in an electrolytic apparatus with a filter, depicting electrodes in still another position relative to the filter.

FIG. 9 is a schematic representation of an electrolytic apparatus (10) wherein the filter (400) is positioned above a horizontally oriented anode (300) and below a horizontally oriented cathode (350). While the illustration depicts the anode (300) positioned below the filter (400) and the cathode (350) positioned above the filter (400), one skilled in the art will recognize that the anode (300) could be positioned above the filter (400) and the cathode (350) positioned below the filter (400), as appropriate. After application of the electrolytic field, concentrated algal suspension (180) floats toward the surface of the electrolytic apparatus (10) and away from the filter (400), leaving depleted algal suspension (120) adjacent to said filter (400). The depleted algal solution (120) freely flows due to the force of gravity through the filter (400) and into the depleted suspension collection vessel (420). One skilled in the art will recognize that the flow through the filter (400) could be assisted by pressurization of the electrolytic apparatus (10) above the filter (400), vacuum suction applied to the electrolytic apparatus (10) below the filter (400), or the like. In this manner, clogging of the filter (400) with algae particles (150) is minimized or potentially eliminated, especially compared to flowing concentrated algal solution (180) through the filter (400).

Generally, electrolytic processes conducted in aqueous based solution will electrolyze water to oxygen and hydrogen gas. The reaction at the anode at low pH under generally acidic conditions is:

$$H_2O \rightarrow \tfrac{1}{2} O_2 + 2H^+ + 2e^-$$

The reaction at the anode at high pH under generally alkaline conditions is:

$$2\,OH^- \rightarrow \tfrac{1}{2} O_2 + H_2O + 2e^-$$

The reaction at the cathode at low pH under generally acidic conditions is:

$$2\,H^+ + 2e^- \rightarrow H_2$$

The reaction at the cathode at high pH under generally alkaline conditions is:

$$2\,H_2O + 2e^- \rightarrow H_2 + 2OH^-$$

Under either low or high pH conditions, the net reaction is water electrolysis:

$$H_2O \rightarrow \tfrac{1}{2} O_2 + H_2$$

The water electrolysis reactions require significant energy and therefore it is desirable to minimize water electrolysis in order to minimize energy consumption associated with the electrolytic process. An approach to minimize water electrolysis is through the use of high overvoltage anodes (300) and cathodes (350) with electrically conductive diamond coatings as described previously in U.S. Pat. No. 5,900,127 issued May 4, 1999 to Iida. Another approach to minimize water electrolysis is to increase the gap between the anode (300) and cathode (350) so that the voltage drop across the electrolyte is sufficient to decrease the differential voltage near an individual electrode while still effecting the movement of the suspended algae.

Figure 10A:
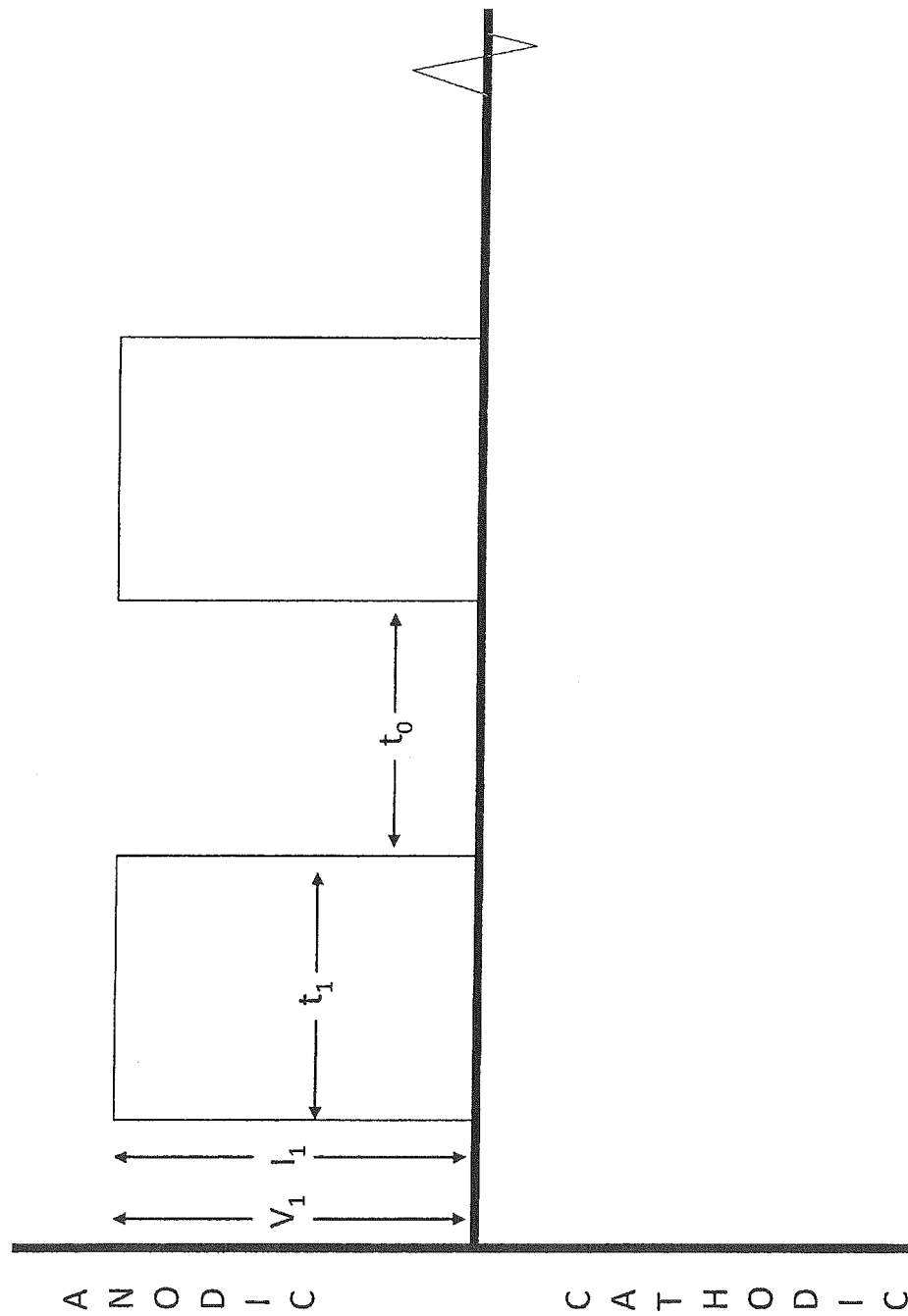
FIG. 10a is a schematic representation of a unidirectional electrolytic pulse process.

In the instant invention, pulse and pulse reverse electrolytic fields are used to induce movement of suspended particles, such as algae, in a solution. Pulse and pulse reverse electrolytic fields offer benefits such as reduced electrolysis and therefore reduced energy consumption. A generalized pulse waveform with unidirectional pulses is shown in FIG. 10a. Although the generalized pulse waveform is depicted for anodic pulses at the anode (300), one skilled in the art would recognize that the unidirectional pulses are cathodic at the cathode (350). In addition, FIG. 10a only depicts two unidirectional pulse cycles. The period T of the waveform is the sum of the anodic on-time $t_1$ and relaxation period $t_0$ ($T=t_1+t_0$). The inverse (1/T) of the period T of the waveform is the frequency f of the waveform. The frequency of the unidirectional pulse waveform is typically 10 to 1000 Hz and more typically 50 to 500 Hz. The ratio ($t_1/T$) of the anodic on-time $t_1$ to the period T is the anodic duty cycle $D_1$. The duty cycle of the unidirectional pulse waveform is typically 10 to 80% and more typically 20 to 60%. The unidirectional pulses are either under voltage control or current control. The voltage during the anodic on-time $t_1$ is referred to as the anodic peak pulse voltage ($V_1$). The voltage of the unidirectional pulse waveform is typically 20 to 400V DC, and more typically 50V DC. The current during the anodic on-time $t_1$ is referred to as the anodic peak pulse current ($I_1$). The anodic charge $Q_1$ is the product of the anodic current density $I_1$ and time $t_1$ ($Q_1=I_1t_1$) The average current $I_{ave}$ is the average anodic current ($I_{ave}=D_1I_1$).

A generalized pulse waveform with bidirectional pulses is shown in FIG. 10b. Although the generalized bidirectional pulse waveform is depicted for anodic pulses and cathodic pulses at the anode (300), one skilled in the art would recognize that the bidirectional pulses are cathodic pulses and anodic pulses at the cathode (350). FIG. 10b only depicts two bidirectional pulse cycles. The period T of the waveform is the sum of the anodic on-time $t_1$, cathodic on-time $t_2$, relaxation period $t_o$, and intermediate period $t_i$ ($T=t_1+t_2+t_o+t_i$). The inverse (1/T) of the period T of the waveform is the frequency f of the waveform. The frequency of the bidirectional pulse waveform is typically 10 to 1000 Hz and more typically 50 to 500 Hz. The ratio ($t_1/T$) of the anodic on-time $t_1$ to the period T is the anodic duty cycle $D_1$ and the ratio ($t_2/T$) of the cathodic on-time $t_2$ to the period T is the cathodic duty cycle $D_2$. The duty cycle of the bidirectional pulse waveform is typically 10 to 80% and more typically 20 to 60%. The bidirectional pulses are either under voltage control or current control. The voltage during the anodic on-time $t_1$ is referred to as the anodic peak voltage ($V_1$) and the voltage during the cathodic on-time $t_2$ is referred to as the cathodic peak voltage ($V_2$). The peak voltage of the bidirectional pulse waveform is typically 20 to 400V DC. The current during the anodic on-time $t_1$ is referred to as the anodic peak current ($I_1$) and the current during the cathodic on-time $t_2$ is referred to as the cathodic peak current ($I_2$). The anodic charge $Q_1$ is the product of the anodic current density $I_1$ and the anodic on-time $t_1$ ($Q_1=I_1t_1$), while the cathodic charge $Q_2$ is the product of the cathodic current density $I_2$ and the cathodic on-time $t_2$ ($Q_2=I_2t_2$). The average current density ($I_{ave}$) is the average anodic current density ($D_1I_1$) minus the average cathodic current density ($D_2I_2$).

EXAMPLES

Electrolytic concentration experiments were conducted with aqueous suspensions of the algae species *Scenedesmus dimorphous* cultured in a covered freshwater pond. The concentration of the *S. dimorphous* prior to and after application of the electrolytic field was determined using a hemacytometer used for cell counts. The initial concentration was determined as 32,750,000 algae cells per milliliter of solution. After electrolytic concentration the hemacytometer was used to determine the cell count, which was then normalized to the initial cell count. An apparatus similar to that shown in FIG. 1 with vertically suspended electrodes was used for the electrolytic concentration experiments. Electrodes characterized with high overvoltages and good stability for the water electrolysis reaction are also desirable to reduce the energy consumption of the electrolytic process. The electrodes used in these experiments consisted of a titanium mesh substrate with a mixed oxide coating, known as a dimensionally stable anode, and were obtained from De Nora Tech of Chadron, Ohio. The gap between the electrodes was approximately 2 cm.

Example 1

The applied voltage was 50V DC with an initial current of 1,300 mA and a final current of 3,000 mA. The voltage was applied for 10 minutes. During the experiment, vigorous electrolysis was observed and the algae collected as a floated mass at the top of the solution. Due to the vigorous electrolysis, the floated algae mass could not be collected and accurately measured for cell count. During the course of the experiment, the container became very hot. The region between the electrodes was visually very clear and cell count indicated that this region was depleted by 181.9 times compared to the initial algae concentration. The energy consumption per volume was calculated as 204 W·hr/L of solution. The water consumption was calculated as 45.5 μL water/L solution (4.56 μL water/(L solution·min)).

Example 2

The applied voltage was 50V DC with an initial current of 1,300 mA and a final current of 2,000 mA. The voltage was applied for 2 minutes. During the experiment, vigorous electrolysis was observed and the algae collected as a floated mass at the top of the solution. Due to the vigorous electrolysis, the floated algae mass could not be collected and accurately measured for cell count. The region between the electrodes was slightly green and cell count indicated that this region was depleted by 7.8 times compared to the initial algae concentration. The energy consumption per volume was calculated as 28 W·hr/L of solution. The water consumption was calculated as 31.8 μL water/L solution (15.9 μL water/(L solution·min)).

Example 3

The applied unidirectional pulsed voltage was 50V PC with a duty cycle of 20% and a frequency of 100 Hz. The initial current was 1,220 mA and a final current of 1,400 mA. The voltage was applied for 4 minutes. During the experiment, minor electrolysis was observed and the algae collected as a floated mass at the top of the solution. The floated algae was collected and the cell count indicated the algae was concentrated by 31.5 times compared to the initial algae concentration. The region between the electrodes was slightly green and cell count indicated that this region was depleted by 12.8 times compared to the initial algae concentration. The energy consumption per volume was calculated as 0.8 W·hr/L of solution. The water consumption was calculated as 0.16 μL water/L solution (0.04 μL water/(L solution·min)).

Although various aspects of the disclosed electrolytic concentration method and apparatus for the concentration of suspended algae from a solution have been shown and described, modifications may occur to those skilled in the art upon reading the specification.

What is claimed is:

1. A method for the filtration of suspended particles in a solution comprising:

a. adding a solution with suspended particles to an electrolytic cell containing a filter and at least an anode and a cathode, wherein said suspended particles are algae particles;
b. establishing a predetermined gap between said anode and said cathode;
c. connecting said anode and said cathode to a power supply; and
d. delivering an electric field from said power supply to said anode and said cathode; wherein said suspended particles move away from said filter, creating a zone of depleted suspended particles near the filter.

2. The method of claim 1 wherein said anode and said cathode are high overvoltage electrodes.

3. The method of claim 2 wherein said electric field comprises a voltage difference across said anode and said cathode of about 20 to 400 V DC.

4. The method of claim 2 wherein said electric field comprises a voltage difference across said anode and said cathode of about 50V DC.

5. The method of claim 2 wherein said electric field is a pulse waveform with bidirectional pulses.

6. The method of claim 2 wherein said electric field is a pulse waveform with unidirectional pulses.

7. The method of claim 6 wherein said pulse waveform with unidirectional pulses comprises a peak voltage of about 20 to 400 V.

8. The method of claim 6 wherein said pulse waveform with unidirectional pulses comprises a peak voltage of about 50 V.

9. The method of claim 6 wherein said pulse waveform with unidirectional pulses comprises a duty cycle of about 10 to 80%.

10. The method of claim 6 wherein said pulse waveform with unidirectional pulses comprises a duty cycle of about 20 to 60%.

11. The method of claim 6 wherein said pulse waveform with unidirectional pulses comprises frequencies of about 10 to 1000 Hz.

12. The method of claim 6 wherein said pulse waveform with unidirectional pulses comprises frequencies of about 50 to 500 Hz.

13. The method of claim 1 wherein said suspended particles are concentrated and collected from the surface region of the electrolytic cell, and transferred to a collection vessel.

14. The method of claim 1 wherein said suspended particles are concentrated and collected from the surface region of the electrolytic cell, and transferred to a moving filter belt.

15. The method of claim 1 wherein said anode is positioned on one side of said filter and said cathode is positioned on the other side of said filter.

16. The method of claim 1 wherein said anode is positioned above said filter and said cathode is positioned above said anode.

17. The method of claim 1 wherein said cathode is positioned above said filter and said anode is positioned above said cathode.

18. The method of claim 1 wherein said anode is positioned above said filter and said cathode is positioned near the surface of said electrolytic apparatus.

19. The method of claim 1 wherein said cathode is positioned above said filter and said anode is positioned near the surface of said electrolytic apparatus.

20. The method of claim 1 wherein said anode is positioned below said filter and said cathode is positioned near the surface of said electrolytic apparatus.

21. The method of claim 1 wherein said cathode is positioned below said filter and said anode is positioned near the surface of said electrolytic apparatus.

22. The method of claim 1 wherein said electrolytic cell comprises a plurality of said anodes and said cathodes.

* * * * *